(12) United States Patent
Sinnarajah et al.

(10) Patent No.: US 7,417,976 B2
(45) Date of Patent: Aug. 26, 2008

(54) METHOD AND APPARATUS FOR CALL SETUP LATENCY REDUCTION

(75) Inventors: Ragulan Sinnarajah, Markham (CA); Edward G. Tiedemann, Jr., Concord, MA (US); Ramin Rezaiifar, San Diego, CA (US); Jun Wang, La Jolla, CA (US); Duncan Ho, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/565,593

(22) Filed: Nov. 30, 2006

(65) Prior Publication Data

US 2007/0091854 A1    Apr. 26, 2007

Related U.S. Application Data

(62) Division of application No. 09/933,473, filed on Aug. 17, 2001, now Pat. No. 7,180,879.

(51) Int. Cl.
*H04B 7/216* (2006.01)
*H04Q 7/00* (2006.01)

(52) U.S. Cl. .................. 370/335; 370/329; 370/441; 370/389; 455/450; 455/452.1

(58) Field of Classification Search .............. 370/329, 370/335, 389, 441, 431, 342; 455/450, 452.1
See application file for complete search history.

(56) References Cited

U.S. PATENT DOCUMENTS 6,757,536 B1 *  6/2004  Kim et al. ............... 455/436

FOREIGN PATENT DOCUMENTS

GB        2 343 330 A  *  5/2000

* cited by examiner

*Primary Examiner*—Melvin Marcelo
*Assistant Examiner*—Nittaya Juntima
(74) *Attorney, Agent, or Firm*—Roberta Anne Young; Kam T. Tam; Thomas R. Rouse

(57) ABSTRACT

Techniques for minimizing call setup latency are disclosed. In one aspect, a channel assignment message is sent with a flag to direct the use of previously negotiated service parameters. This aspect eliminates the need for service negotiation messages. In another aspect, a channel assignment message is sent with an active set identifier instead of an active set and its parameters. This aspect reduces the transmission time of the channel assignment message. In yet another aspect, call setup without paging is facilitated by a mobile station (106) sending a pilot strength measurement message between active communication sessions, such that a channel assignment message can be used for mobile station terminated call setup without the need for mobile station paging and related messages.

10 Claims, 10 Drawing Sheets

METHOD AND APPARATUS FOR CALL SETUP LATENCY REDUCTION

CLAIM OF PRIORITY UNDER 35 U.S.C. §120

The present Application for Patent is a Divisional and claims priority to U.S. patent application Ser. No. 09/933, 473, now U.S. Pat. No. 7,180,879 entitled "Method and Apparatus for Call Setup Latency Reduction" filed Aug. 17, 2001, and assigned to the assignee hereof and hereby expressly incorporated by reference herein.

FIELD

The present invention relates generally to communication, and more specifically to a novel and improved method and apparatus for call setup latency reduction in a wireless communication system.

BACKGROUND

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. These named standards are incorporated herein by reference.

Call setup is the process of establishing dedicated physical channels and negotiating service configuration parameters between a mobile station and a base station so that communication can take place. Call setup procedures fall into two classes. Mobile station originated call setup occurs when a mobile station user makes a call. Mobile station terminated call setup occurs when a call is made to the mobile station.

Call setup procedures involve signaling between a mobile switching center (MSC) or packet data service node (PDSN), one or more base stations (BS), and a mobile station (MS). As used herein, the term base station can be used interchangeably with the term access point. The term mobile station can be used interchangeably with the terms subscriber unit, subscriber station, access terminal, remote terminal, or other corresponding terms known in the art. The term mobile station encompasses fixed wireless applications. Signals from the mobile station are known as the reverse link, reverse channel, or reverse traffic. Signals to the mobile station are known as the forward link, forward channel, or forward traffic.

FIG. 1 depicts a mobile station originated call setup procedure as defined in Release A of the cdma2000 standard. In step 1, the mobile station sends an Origination Message 1 to the base station. This message indicates to the network that the mobile station user wants to make a call. It contains dialed digits and a service option number to indicate the type of call (i.e. voice, data, etc.). A list of pilot signals from neighboring base stations that have been received at the mobile station with sufficient strength are also included in this message, so that the base station can determine which pilots to include in the active set.

In step 2, upon successfully receiving the Origination Message 1, the base station sends a Base Station Acknowledgement Order 2 to the mobile station. This message acknowledges the receipt of the Origination Message 1.

In step 3, the base station sends a Connection Management (CM) Service Request Message 3 to the MSC, which triggers the MSC to setup the call. This message contains relevant information received from the mobile station in the Origination Message 1.

The MSC responds with an Assignment Request Message 4 to the base station in step 4. This message indicates to the base station to setup the radio channel. However, the base station has the option of setting up the radio channel as soon as the Origination Message 1 is received.

Note that in this figure, as well as in those figures described below, the order in which the Assignment Request Message 4 is delivered from the MSC to the base station in relation to other message deliveries is somewhat flexible. There are rules limiting that flexibility. The Assignment Request Message 4 will be sent from the MSC to the base station after the MSC receives the CM Service Request Message 3 (for mobile station originated call setup) or the Paging Response Message 25 (for mobile station terminated call setup, described below). The Assignment Request Message 4 comes before the base station sends the Service Connect Message 10 to the mobile station, described below.

In step 5, the base station sends a Channel Assignment Message 5 to the mobile station. The standard also defines an Extended Channel Assignment Message. As defined herein, the Channel Assignment Message 5 represents either message. This message assigns a dedicated physical channel to the mobile station for the purpose of carrying the user traffic associated with the call. It includes the relevant information for all pilots in the active set of the mobile station. After this step, the mobile station enters the traffic state 450. A state diagram including that state and others is detailed below with reference to FIG. 4.

In step 6, upon receiving the Channel Assignment Message 5, and after receiving two consecutive good frames on the forward link, the mobile station sends a preamble to the base station to help the base station acquire the reverse link signals from the mobile station. Once the reverse link has been acquired, the base station sends the Base Station Acknowledgement Order 7 to the mobile station in step 7. Upon receiving the Base Station Acknowledgement Order 7, the mobile station sends the Mobile Station Acknowledgement Order 8 to the base station in step 8 to indicate that the mobile station has acquired the forward link being transmitted by the base station.

Now the dedicated physical channels have been successfully set up. In step 9, a service negotiation procedure takes place between the mobile station and the base station to determine the format of information transfer. Examples of negotiated items include frame rate, frame type, transmission rates, and type of traffic (i.e. voice or data, vocoder rate if applicable). Some items are specified by the base station and therefore non-negotiable (e.g. mapping of logical channels to physical channels). Negotiation may involve multiple exchanges of Service Request Messages and Service Response Messages between the mobile station and the base station. The information exchanged is contained in a Service Configuration information record. The final negotiation message sent, in step 10, is a Service Connect Message 10 from the base station to the mobile station. Both the Service Configuration information record and a Non-Negotiable Service Configuration information record are sent. The standard also allows the General Handoff Direction Message or the Universal Handoff Direction Message to be sent instead of the Service Connect Message in situations where a radio handoff becomes necessary while service negotiation is in progress.

In some instances service negotiation, step 9, can be avoided. If the mobile station is to use a previously stored service configuration, the base station simply sends a Service Connect Message 10, step 10, with an indication to use the previously stored service configuration. In the standard, this corresponds to setting the $USE_{13}$ OLD_SERV_CONFIG flag to '01'.

In step 11, upon receiving the Service Connect Message 10, the mobile station sends a Service Connect Completion Message 11 to the base station to indicate that it has accepted the proposed service configuration. Upon receiving the Service Connect Completion Message 11, in step 12, the base station sends an Assignment Complete Message 12 to the MSC to indicate that the base station has successfully set up the call.

After step 10, the Service Connect Message 10, the service configuration specified by the message takes effect. Now the call setup is complete and user traffic (i.e. voice or data) between the mobile station and the base station can flow. The traffic will flow between the base station and the MSC (for voice calls) or between the base station and the PDSN (for packet data calls) after step 12, the Assignment Complete Message 12.

FIG. 2 depicts a mobile station terminated call setup procedure as defined in Release A of the cdma2000 standard. First, the MSC sends a Paging Request Message 21 to the base station to indicate a call is incoming to the mobile station. Second, a General Page Message 22 is sent from the base station to the mobile station. The standard also identifies a Universal Page Message, whose function is similar to the General Page Message 22, and the latter term will be used throughout to indicate either message. This message may be sent out over one or more sectors. This message indicates to the mobile station that it is receiving a call, and the Service Option number corresponding to the call.

Third, upon receiving the General Page Message 22, the mobile station sends a Page Response Message 23 to the base station, including the list of pilots, similar to that described in Origination Message 1 above, so that the base station can determine the appropriate active set. Fourth, upon successfully receiving the Page Response Message 23, the BS sends a Base Station Acknowledgment Order 2 to the mobile station, as described in step 2 with respect to FIG. 1 above. This message acknowledges receipt of the Page Response Message 23.

Fifth, the base station sends a Paging Response Message 25 to the MSC, which triggers the MSC to set up the call. The subsequent steps shown in FIG. 2 correspond to the like-numbered steps and messages described in steps 4 through 12 above with respect to FIG. 1.

Each step in the call setup procedures just described contributes to the call setup latency. Call setup latency, or the time required to set up a call, is an increasingly important parameter in wireless system design as data use becomes more prevalent. Modern wireless data communication systems offer "always on" connectivity. As those skilled in packet-switched network design know, "always on" connectivity does not mean a physical channel is permanently dedicated to a specific user. This would be bandwidth inefficient, and unlikely to be cost-effective for subscribers. Instead, when a mobile station engages in data communications, a call is setup to allow one or more packets to be transmitted, then the call is torn down to free up the channel for another user. In a typical data communication session, calls will be set up and torn down repeatedly, with call setup latency occurring during each call. Naturally, decreasing call latency, while important in voice communications as well, is very important to provide a compelling user experience to the wireless data user.

Each step, described above, introduces latency due in part to the time required to transmit each message, and in part due to the processing time required to receive each message and determine the appropriate next step. Furthermore, much of the call setup signaling occurs on common channels which are shared by a number of mobile stations and a base station. As such, a component of the call setup latency is introduced when a mobile station must make repeated attempts to gain access to the common channel (known as the access channel). Furthermore, a message for a particular mobile station may have to be queued with messages for other mobile stations, yet another source of latency in performing the steps described above. Therefore, reducing the number of steps in the call setup procedure is one effective means to reduce call latency, as is reducing the transmission and/or processing time associated with any remaining messages.

One example of a reduced-latency call setup procedure is defined in the HDR specification, and depicted in FIG. 3. Such a system is disclosed in U.S. Pat. No. 7,099,629, entitled "METHOD AND APPARATUS FOR ADAPTIVE TRANSMISSION CONTROL IN A HIGH DATA RATE COMMUNICATION SYSTEM", issued Aug. 29, 2006, assigned to the assignee of the present invention and incorporated by reference herein.

FIG. 3 depicts a mobile station terminated call setup procedure with reduced steps compared to the procedure described with respect to FIG. 2. Essentially, steps 2 through 4, corresponding to messages 22, 23, and 2 in FIG. 2 respectively, are removed. Instead of the base station sending the mobile station a General Page Message 22 in response to the Paging Request Message 21 from the MSC, the base station sends a modified Channel Assignment Message 30. Channel Assignment Message 30 takes the place of the General Page Message 22 (step 2 in FIG. 2) and Channel Assignment Message 5 (step 7 in FIG. 2). This eliminates the need for the Page Response Message 23 (step 3 in FIG. 2) and the Base Station Acknowledgement Order 2 (step 4 in FIG. 2). The removal of these three steps significantly lowers call setup latency.

The steps of the procedure of FIG. 3 are as follows. First, the MSC sends the base station Paging Request Message 21. In response, the base station sends the mobile station identified in Paging Request Message 21 a Channel Assignment Message 30, as just described. The mobile station enters the traffic state 450 after receiving this message. After receiving two consecutive good frames on the forward link, the mobile station sends a preamble 6 to the base station. The base station acknowledges acquisition of the preamble 6 by sending the mobile station a Base Station Acknowledgement Order 7. In response, the mobile station sends the base station a Mobile Station Acknowledgement Order 8. The base station sends the MSC a Paging Response Message 25 to trigger the MSC to set up the call. Assignment Request Message 4 is delivered from the MSC to the base station. Service negotiation 9 then takes place, unless a mitigated by an indication to use a previously stored service configuration (i.e. setting USE_OLD_SERV_CONFIG to '01'). Service Connect Message 10 is delivered from the base station to the mobile station to end any negotiation. The mobile station accepts the Service Connect Message 10 with a Service Connect Completion Message 11. The base station lets the MSC know that the call is set up with an Assignment Complete Message 12.

After the Service Connect Message 10, the service configuration specified by the message takes effect. Now the call setup is complete and user traffic (i.e. voice or data) between the mobile station and the base station can flow. As described above with respect to FIG. 1, the traffic will also flow between the base station and the MSC (for voice calls) or between the base station and the PDSN (for packet data calls) after step 12, the Assignment Complete Message 12.

FIG. 4 depicts a mobile station state diagram. The states shown are general states useful for describing call setup, and do not represent every state a mobile station can enter. Furthermore, not all possible state transitions are shown. Rather, the subset useful for discussing the various aspects of the present invention is shown. State 410 is a power up state, the state a mobile station enters when it is powered on. The mobile station then proceeds to the initialization state 420, in which the mobile station attempts to acquire a system. Once system timing for at least one base station is acquired, the mobile station enters the idle state 430, where it monitors the paging channel for any messages directed to it, such as General Page Message 22 or Channel Assignment Message 30, described above.

From the idle state 430, the mobile station may enter the system access state 440 for a number of reasons. The system access state is entered when the mobile station wishes to communicate on the access channel (shared among a plurality of mobile stations) to a base station. One reason for entering the system access state and communicating on the access channel is when a mobile station has entered a new cell boundary or recently powered up and needs to register its location with a base station. Another reason is to respond to a General Page Message 22 or Channel Assignment Message 30, described above (for mobile terminated calls). A third reason is for sending an Origination Message 1, described above (for mobile originated calls). If a call setup procedure is initiated, such as those described above, the mobile station proceeds to the traffic state 450 upon successful call setup. This state was referenced in FIGS. 1-3, above.

The mobile station leaves system access state 440 to reenter idle state 430 when a registration is complete (and no call setup was initiated), a message is completed that does not require the mobile station to remain in the access state, the mobile station fails to gain access on the common access channel (for reasons including congestion due to other mobile stations' accesses), or when the base station fails to acknowledge a transmitted message. Furthermore, failure to gain access or failure to receive acknowledgement may cause the mobile station to revert to the initialization state 420, depending on how the system is designed. It may be that upon these failure events, it is advisable to attempt to acquire a different base station rather than to make additional attempts with a base station that is not responding.

Idle state 430 is left for initialization state 420 when the mobile station is unable to receive pages (meaning a new base station may need to be acquired), or the mobile station is directed to perform an idle handoff (that is, directed to cease monitoring the common channel of the current base station and acquire the common channel of a neighboring base station instead).

Useful in a wireless communication system is a short data burst (SDB) feature. This allows a small packet of information to be encapsulated in a message from a mobile station to a base station on the access channel. Therefore, a complete call setup is not required, since the traffic state is never entered. Such a SDB feature is specified in cdma2000. The SDB procedure is carried out as follows. From the system access state, a mobile station sends a Data Burst Message to the base station which includes the SDB information packet. The base station sends an Application Data Delivery Service (ADDS) Transfer Message to the MSC, which includes the SDB information packet as well as application layer information (i.e. identifying the type of packet, such as SDB, short messaging service (SMS), position location, and the like). The base station acknowledges the Data Burst Message by sending a Base Station Acknowledgement Order to the mobile station. The MSC (or PDSN) routes the packet data accordingly.

One example of the use of SDB is when an Internet Protocol (IP) packet is encapsulated in the SDB information. In this case, the MSC or PDSN can route the packet to a destination on the Internet or an intranet, perhaps to an application server. In some instances, an SDB packet delivered to an application server may serve to initiate data communication between the server and the mobile station which may ultimately require a traffic channel to be set up for the continued communication. Under these circumstances, the SDB message will be followed by a complete call setup procedure such as that described in reference to FIG. 1. And, as mentioned previously, the ongoing communication between the application server and the mobile station may entail numerous call setups, a byproduct of the nature of packet data communications. This example serves to further highlight the need for minimizing call setup latency.

As described, call setup latency is formed through multiple message transmissions and corresponding acknowledgements, the length of each message, and the associated processing required with each message. Call setup latency is one cause of delay that is undesirable in many communication applications: voice communications as well as data communications. To the extent that multiple calls must be setup during a communication session, a typical scenario with data, the delay introduced is exacerbated. There is therefore a need in the art for communication systems that minimize call setup latency.

SUMMARY

Embodiments disclosed herein address the need for communications systems that minimize call setup latency. In one aspect, a channel assignment message is sent with a flag to direct the use of previously negotiated service parameters. This aspect eliminates the need for service negotiation messages. In another aspect, a channel assignment message is sent with an active set identifier instead of an active set and its parameters. This aspect reduces the transmission time of the channel assignment message. In yet another aspect, call setup without paging is facilitated by a mobile station sending a pilot strength measurement message between active communication sessions, such that a channel assignment message can be used for mobile station terminated call setup without the need for mobile station paging and related messages. In yet another aspect, a mobile station can send short data burst information and initiate call setup by sending an origination message containing the short data burst information. This aspect allows call setup to follow a short data burst message without the need for additional messaging. In yet another aspect, a reconnect message is sent to activate a dormant packet data call. This aspect reduces transmission time and message error rate, particularly when the reconnect message can be contained in a single frame. In yet another aspect, a preamble is sent on the reverse link directly following a channel assignment message. This aspect eliminates call latency introduced by waiting for forward link conditions before transmitting the preamble. Various other aspects of the invention are also presented. These aspects, collectively, yield the advanced benefits of reduced message transmission time, reduced number of messages transmitted, lower related processing requirements, and added flexibility, with a net result of reduced call setup latency.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 5:
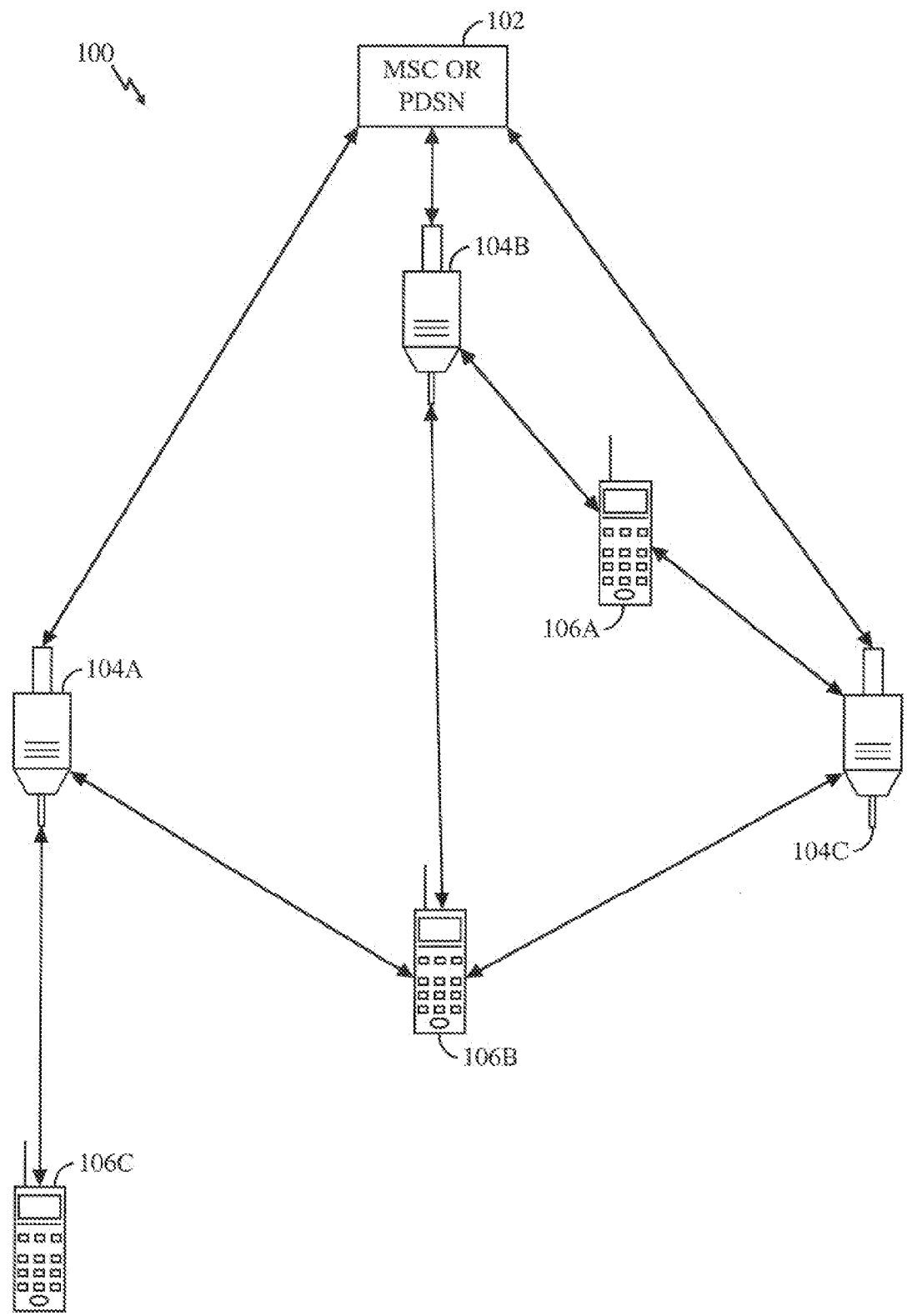
FIG. 5 is a wireless communication system that supports a number of users, and which can implement various aspects of the invention.

FIG. 5 is a diagram of a wireless communication system 100 that supports a number of users, and which can implement various aspects of the invention. System 100 may be designed to support one or more standards and/or designs (e.g., the IS-95 standard, the cdma2000 standard, the HDR specification). For simplicity, system 100 is shown to include three base stations 104 in communication with three mobile stations 106. The base station and its coverage area are often collectively referred to as a "cell". Each base station 104 communicates with MSC or PDSN 102. The MSC or PDSN 102 may communicate with a network, such as the Public Switched Telephone Network (PSTN), Internet or an intranet (not shown).

For mobile station terminated calls, Release A of the cdma2000 standard requires that the mobile station must first be paged (via a General Page Message or a Universal Page Message). Then, when the mobile station sends the Page Response Message from the system access state, the base station can send the channel assignment (via the Channel Assignment Message). While waiting for the channel assignment in the system access state, the mobile station monitors the paging channel.

As described above in reference to FIG. 3, an enhancement allows the base station to bypass paging by sending the channel assignment directly to the mobile station in the idle state. This has two advantages: it eliminates the need to send the General Page Message (or the Universal Page Message) to the mobile station, and it eliminates the need for a time-consuming access attempt by the mobile station (to send the Page Response Message). The net effect is that the call setup latency is reduced.

However, there are several reasons for paging the mobile station prior to channel assignment. One is to receive the pilot report in the Page Response Message, which can be used to determine the active set. But in some instances, such as when the time lapsed since the mobile station was last on the traffic channel is small, it is likely that the previously used active set will be sufficient to maintain the call. For those cases when an update is required, an alternative to paging can be used. The following are two methods for providing the information to update the active set in response to changes occurring between successive traffic channel operations.

Figure 6:
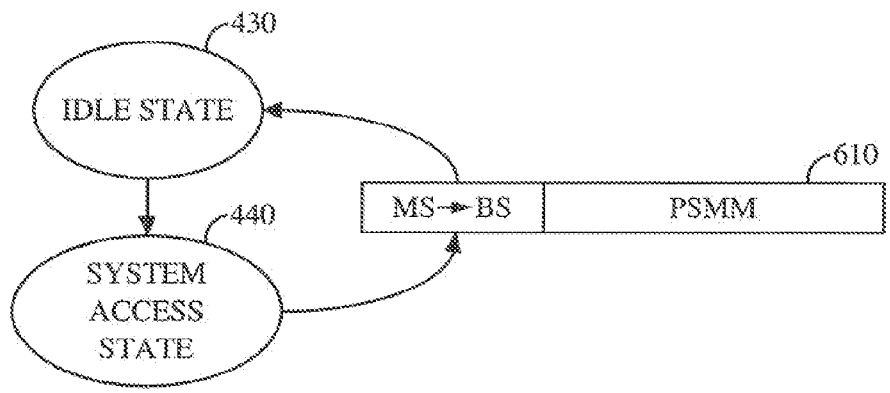
FIG. 6 depicts a method for updating pilot strength information between calls to allow for call setup without paging.

One embodiment is depicted in FIG. 6. The mobile station is in the idle state 430 when it determines an update is required. For example, the mobile station may determine that a pilot needs to be added to the active set. It proceeds to the system access state 440 and delivers a Pilot Strength Measurement Message (PSMM) 610 to the base station. Following this message transmission the mobile station returns to the idle state 430. The PSMM 610 contains the information the base station needs to update the active set (that is, pilot strengths seen by the mobile station). Later, the base station is free to perform call setup as described in FIG. 3, since the required base stations will be in the updated active set. To reduce signaling on the access channel, the PSMM 610 does not need to be sent in order to drop a member from the active set, because a larger active set won't preclude successful communication. The mobile station can signal the base station on a traffic channel to remove a member from the active set once the mobile station is assigned to that traffic channel. Another means to control excessive access channel signaling is to enable the PSMM 610 updating procedure on only a subset of mobile stations at one time.

An alternate embodiment avoids adding additional signaling to the access channel, reducing the average access delay but with the tradeoff of increased maximum delay. In this embodiment, depicted in FIG. 7, the active set is not updated between successive mobile station traffic channel operations. To initiate a new call, the base station sends the mobile station a Channel Assignment Message 30, as described in the procedure of FIG. 3. In decision block 710, the mobile station determines whether the current active set is correct. If so, then the call setup procedure is continued in block 750. When, as described above, the circumstances are such that the likelihood of the active set remaining constant over a number of calls is high, then more often than not the call setup procedure will flow without increased delay, and the extra access channel signaling that the embodiment of FIG. 6 would have introduced has been avoided.

In the event that the active set does need to be updated, then in decision block 710 the mobile station will proceed to send PSMM 720 to the base station on the access channel. PSMM 720 can contain similar information as PSMM 610. In block 730, the base station reconfigures the active set, then sends updated Channel Assignment Message 740 to the mobile station, and then call setup can continue in block 750. This additional signaling, described in blocks 720 through 740 introduces additional delay compared to the setup procedure of FIG. 3.

Figure 7:
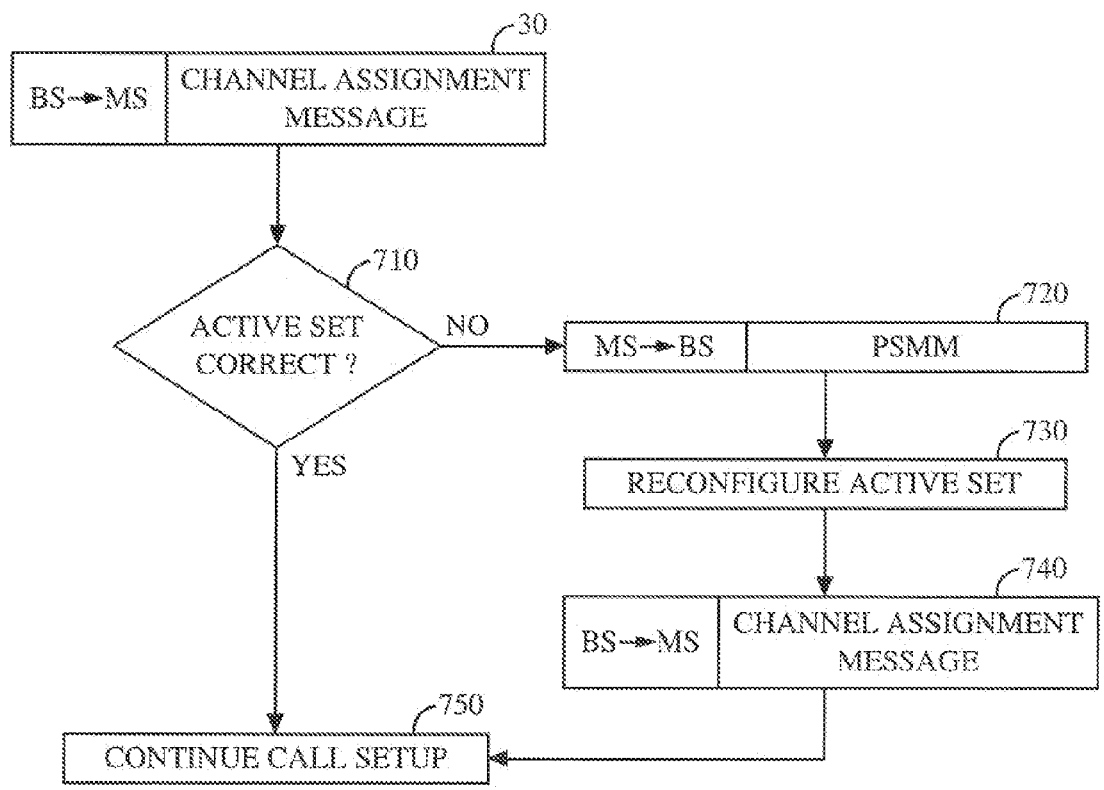
FIG. 7 depicts an alternate method for updating pilot strength information to allow for call setup without paging.

System designers can employ the embodiment of FIG. 6, the embodiment of FIG. 7, or a combination of both as desired to minimize the overall call setup latency based on the likelihood of active set changes. As described, additional signaling on the access channel, described in FIG. 6, can be traded off with the chance of increased maximum call setup time (but with reduced average call setup time) with the procedure of FIG. 7. When it is more likely that the active set is correct, this method can be used to decrease the mean access time. However, the maximum delay may be increased (for those situations where the active set must be updated).

Figure 2:
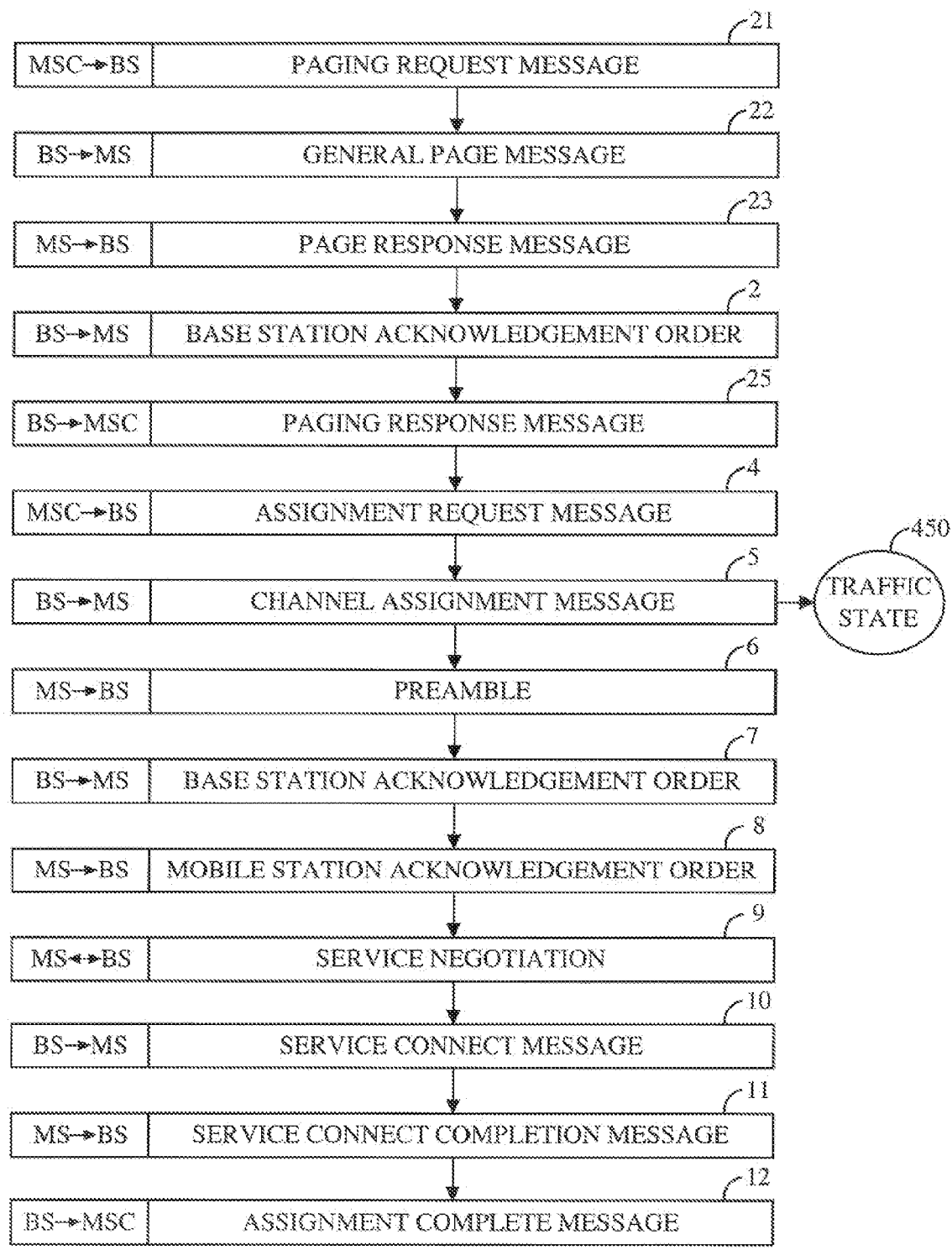
FIG. 2 depicts a mobile terminated call setup procedure.
Figure 3:
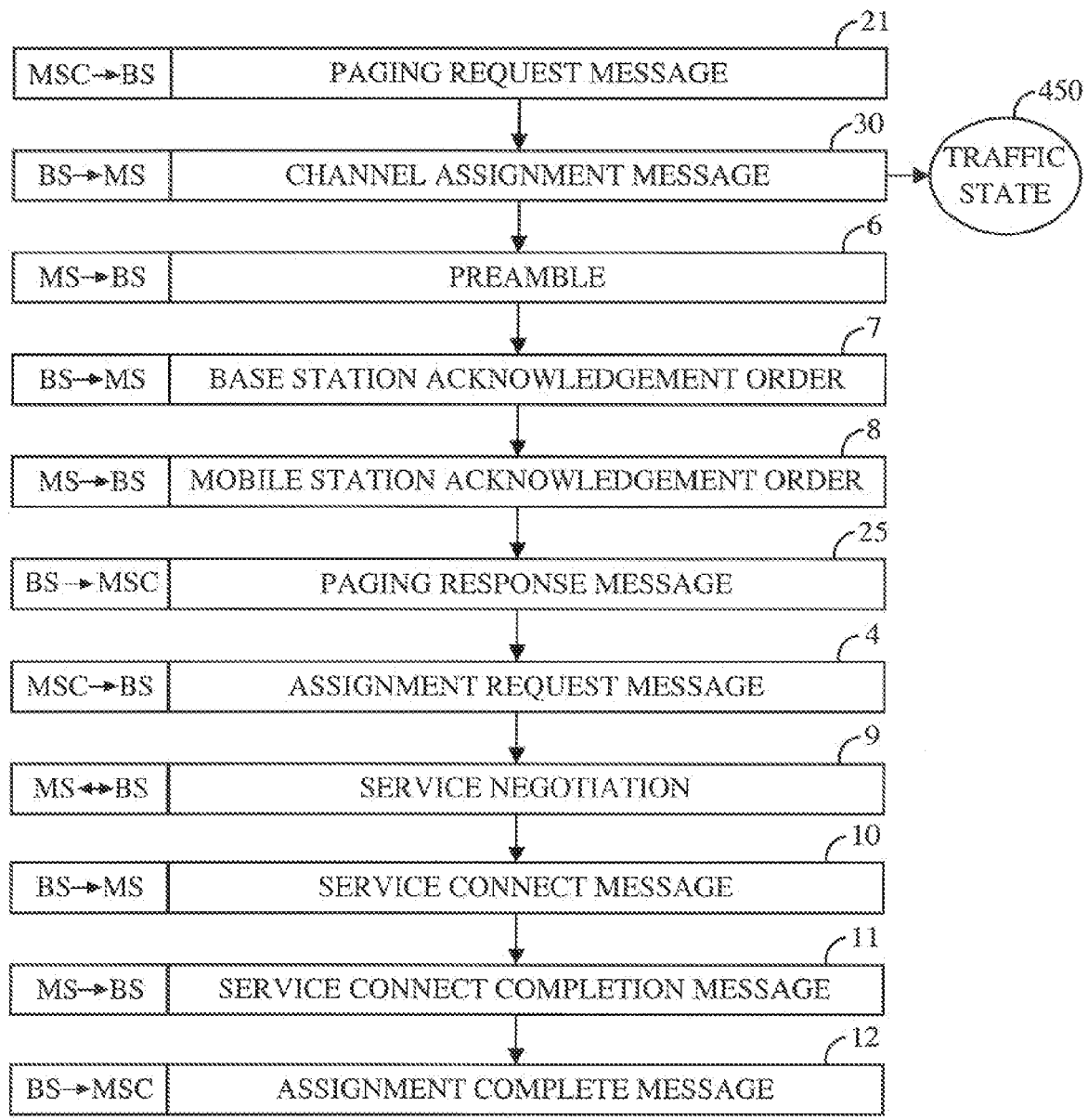
FIG. 3 depicts a mobile terminated call setup procedure without paging.
Figure 4:
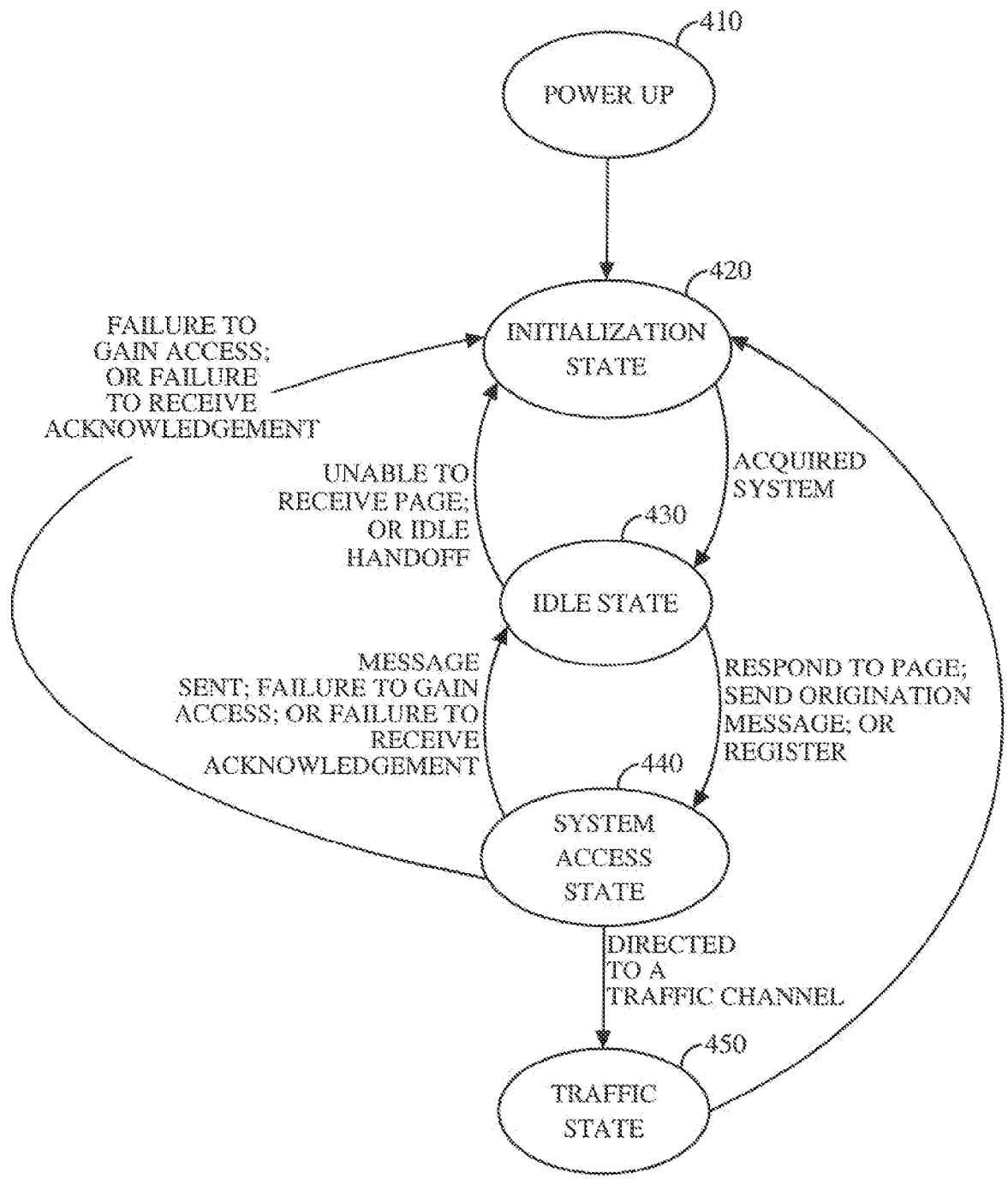
FIG. 4 is a mobile station state diagram.

As an example, a base station can enable the procedure of FIG. 6 for mobile stations whose roaming is introducing many changes in the received pilot strengths of the various neighboring base stations, and can disable the procedure of FIG. 6, opting for the occasional increased maximum delay of FIG. 7, for subscriber units which are fixed or not traveling often. Another option is that a base station can determine which call setup procedure to use based on the time lapse since the previous access by a mobile station. If the time lapse is small, it may be likely that the mobile station is in the same sector, and a reduced latency procedure such as that described in FIG. 3, 6, or 7 is in order. If the time lapse is greater than a threshold, the base station may decide to use a call setup procedure which includes paging, such as that described in FIG. 2.

In Release A of the cdma2000 standard, the Page Response Message 23 is also used to deliver an authentication value, AUTH_R. Authentication of the mobile station is accomplished by performing an authentication algorithm on a shared secret between the base station and the mobile station and a random number to produce AUTH_R. AUTH_R is calculated in both the mobile station and the base station, and the base station must receive a matching AUTH_R from the mobile station in order to ensure the mobile station is authentic. Naturally, if the Page Response Message 23 is eliminated, an alternative mechanism must be introduced to deliver AUTH_R for authentication. One alternative is for the mobile station to deliver AUTH_R on the traffic channel. Since the computation of AUTH_R may take some time, this alternative has the added benefit of allowing the computation to occur in parallel with the remainder of the call setup procedure. The authentication response is delivered on the traffic channel once call setup is complete. Note that since user traffic cannot flow before the Service Connect Message is sent, if authentication on the traffic channel fails, the call can be immediately released. This technique enables channel assignment without paging and hence reduces call setup latency.

In Release A cdma2000 systems, each time dedicated channels are established for the purpose of setting up a call, the mobile station and the base station must agree (via service negotiation) on service configuration parameters to be used for exchanging user and signaling information. As described above, the capability exists that allows the mobile station and the base station to store the mutually agreed-to service configuration (i.e. the Service Configuration information record and the Non-Negotiable Service Configuration information record) upon releasing the dedicated traffic channels and entering the idle state. This stored configuration can be restored upon re-establishing the dedicated channels, thus avoiding performing service negotiation. This reduces the call setup latency. However, Release A still requires that, upon establishing the dedicated traffic channels, the base station sends the Service Connect Message instructing the mobile station to use the stored service configuration. The Service Connect Message belongs in the class of service negotiation messages.

Figure 1:
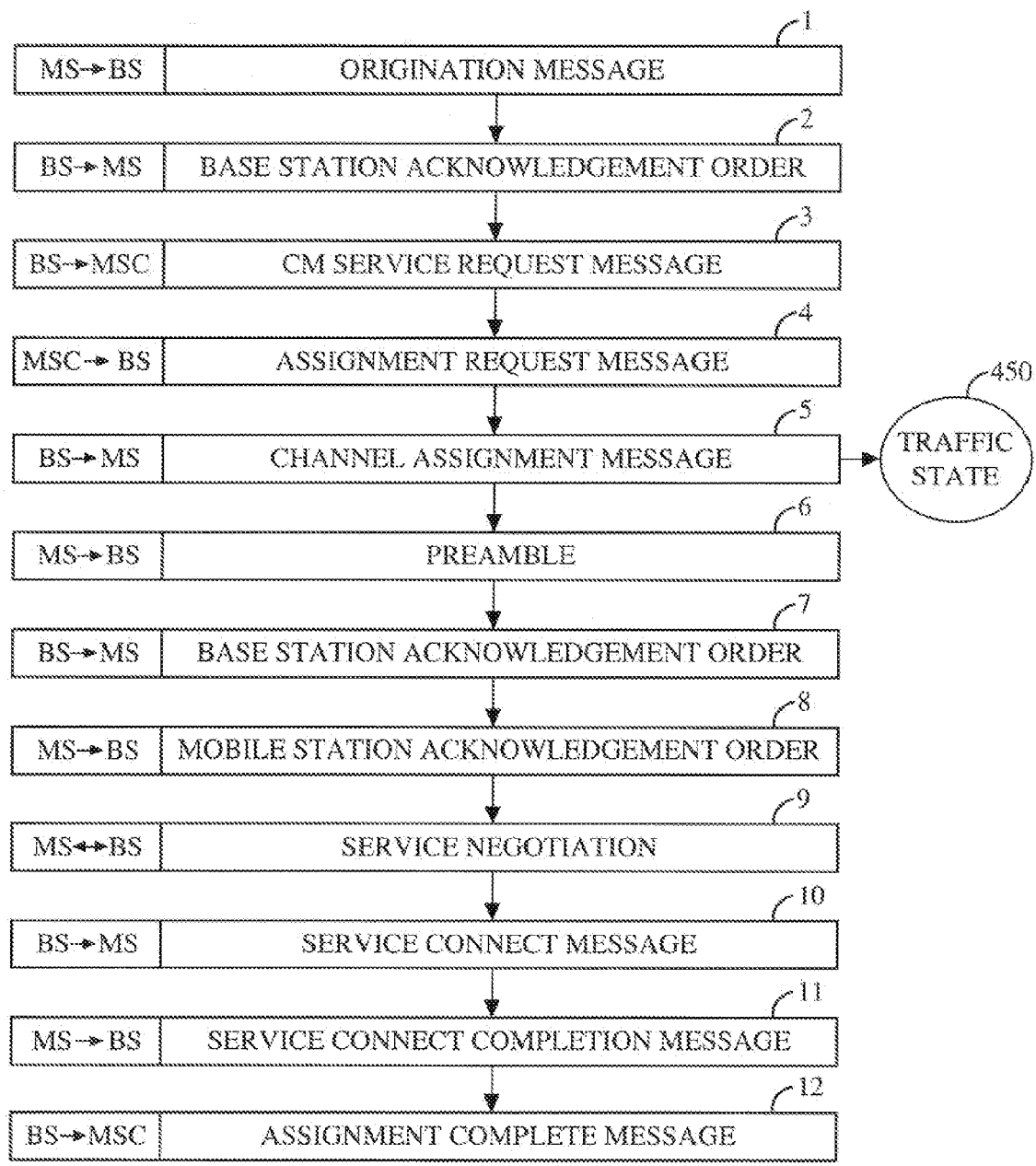
FIG. 1 depicts a mobile originated call setup procedure.
Figure 8:
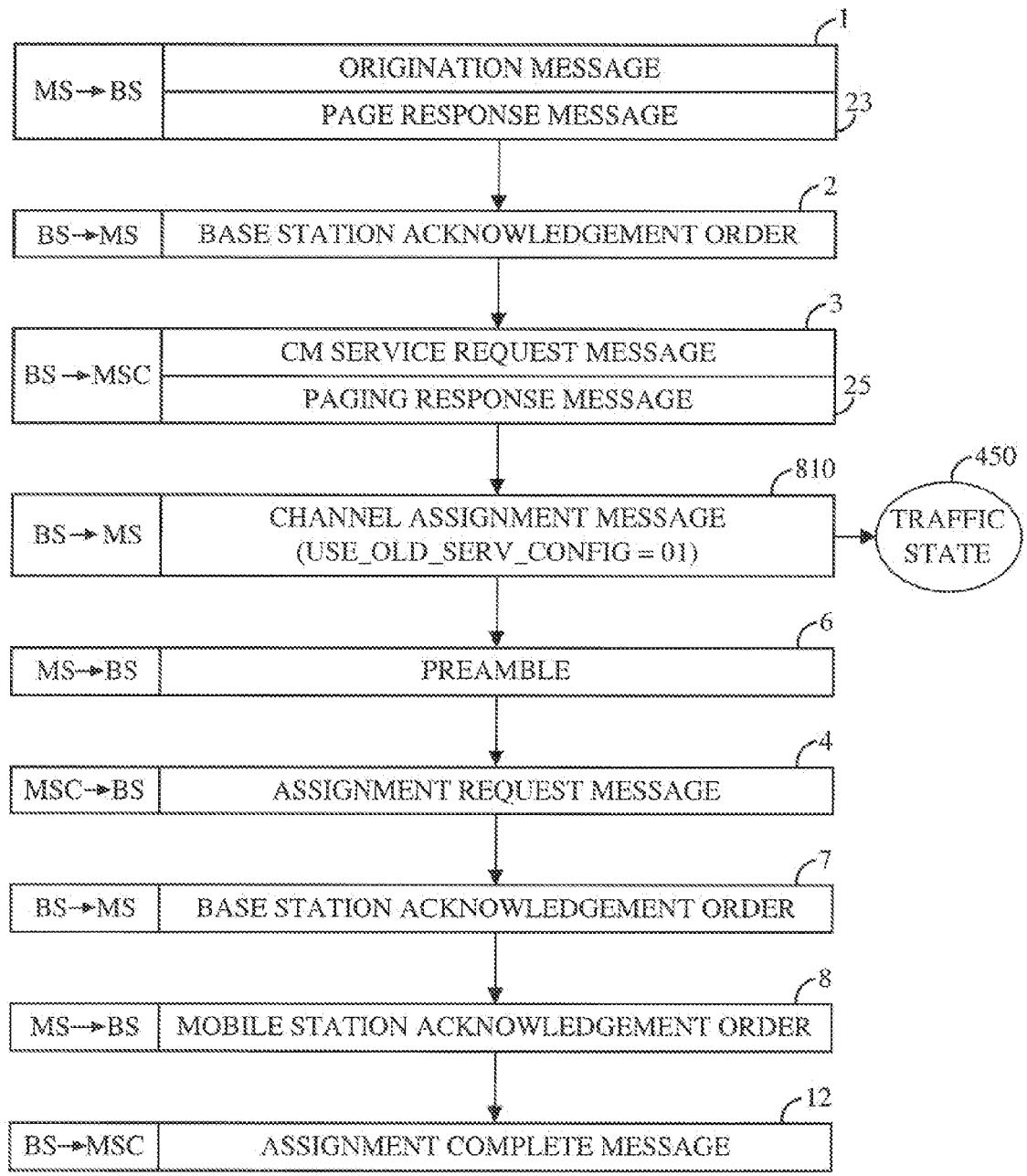
FIG. 8 is a procedure for performing mobile terminated or originated call setup without using service negotiation messages.

FIG. 8 depicts an embodiment of a call setup procedure which eliminates the service negotiation messages, thus reducing call setup latency. In this embodiment, the USE_OLD_SERV_CONFIG flag (described above) is included in the Channel Assignment Message 810. When this flag is set to '01', then the negotiation step (i.e. step 9 in FIGS. 1-3) is not required. Furthermore, since the flag is included in the Channel Assignment Message 810, the Service Connect Message and Service Connect Completion Message (10 and 11, respectively, in FIGS. 1-3) are also eliminated. In addition to the latency reduction from eliminating transmission of these messages, the processing time associated with them is also removed. Another benefit is that the mobile station and the base station can immediately restore the stored service configuration and start exchanging user traffic as soon as the dedicated traffic channels are established. The net effect is that call setup latency is reduced.

The following is a more detailed description of the method of the embodiment depicted in FIG. 8. This embodiment is applicable to either mobile originated or mobile terminated call setup procedures. In the first step, an Origination Message 1 or a Page Response Message 23 is transmitted from the mobile station to the base station, depending on whether the call is mobile originated or mobile terminated, respectively. The base station responds by sending the mobile station a Base Station Acknowledgement Order 2. The base station then communicates to the MSC either a Connection Management Service Request Message 3 or a Paging Response Message 25, depending on whether the call is mobile originated or mobile terminated, respectively. The base station then sends to the mobile station a Channel Assignment Message 810 which includes a USE_OLD_SERV_CONFIG flag. This flag is set whenever the base station wishes to avoid the service negotiation step and has determined that the previously stored configuration may be adequate. After this step, the mobile station enters the traffic state 450.

The remaining steps are similar to previously described call setup procedures, with the exception of the removal of service negotiation steps as just described. Upon receiving two consecutive good frames on the forward link, the mobile station begins transmitting a preamble 6 to the base station. The MSC sends an Assignment Request Message 4 to the base station. (The order in which the MSC sends the Assignment Request Message 4 is not important since a prior configuration is being reestablished.) The base station sends the mobile station a Base Station Acknowledgement Order 7. The mobile station responds to the base station with a Mobile Station Acknowledgment Order 8, at which time traffic can begin to flow between the base station and the mobile station. Finally, the base station reports an Assignment Complete Message 12 to the MSC (at which time the traffic flows between the base station and the MSC.

In the call setup procedure as specified by Release A, the Assignment Complete Message 12 is sent from the base station to the MSC only upon receiving the Service Connect Completion Message 11 from the mobile station. But in the embodiment of FIG. 8, the Assignment Complete Message 12 can be sent to the MSC immediately upon establishing the dedicated channel or channels and receiving the MS Acknowledgement Order from the mobile station. Thus, the network-side connection setup can, to an extent, occur in parallel with the air interface connection setup, further reducing call setup latency.

In some circumstances, it may be desirable for a mobile station to discard a previously stored service configuration once it determines that service negotiation will be required. For example, Release A specifies an early channel assignment feature, in which the base station responds to an origination message by blindly assigning a channel to the mobile station. If a Channel Assignment Message 810 is used, it may be that the base station does not yet know if the old service configuration can be used at the time the message is transmitted. In these circumstances, the mobile station should retain the prior configuration information, as a Service Connect Message 10 containing a USE_OLD_SERV_CONFIG='01' flag may yet arrive and Service Negotiation 9 may yet be avoided. One method for addressing this issue is for the mobile station to retain the stored prior configuration even if a Channel Assignment Message 810 is received without the flag set to use the prior configuration. Only when service negotiation begins should the mobile discard the prior data.

An alternative is to add additional values to the USE_OLD_SERV_CONFIG flag. For example, if the Channel Assignment Message 810 is sent with a flag indicating that the prior stored configuration is valid, clearly the mobile station will not discard it. This case would not occur when the base station did not know whether or not the prior configuration would be valid. In that case, an additional flag value could be sent to indicate that it is not yet known whether the prior configuration is valid. At this point the mobile station would retain the data, and wait to discard it until service negotiation is required. Finally, when it is not an early channel assignment, and the base station knows the prior configuration is no longer suitable, a flag value can be sent that indicates the mobile is free to discard the data, as service negotiation will be required.

Another embodiment addresses call setup latency with respect to the short data burst (SDB) features, described above. There are applications where the mobile station needs to send a large amount of information over the air and, hence, needs to establish dedicated channels to carry the data. This would, of course, require a call setup procedure. As noted earlier, SDB provides a mechanism for transmitting a small amount of data on the common channel, without performing a complete call setup.

In order to the expedite initiation of operations on the network side, the mobile station can send a small amount of information over the common channels first (to trigger network operations) using the SDB feature. Subsequently, a dedicated channel or channels can be set up to transmit the large amount of data. Following the procedures defined in Release A, the foregoing would require one common channel access and subsequent transmission of the Data Burst Message, followed by another access and subsequent transmission of an Origination Message. That is, two time-consuming access attempts would be needed.

Figure 9:
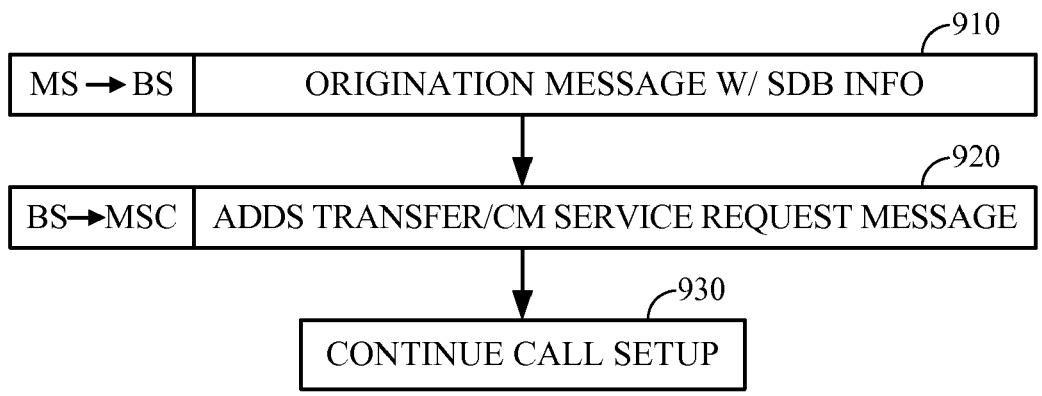
FIG. 9 depicts a method for simultaneously sending short data burst information and originating a call.

In the embodiment of FIG. 9, the mobile station can simultaneously begin the call setup procedure and perform SDB by including the SDB information in an Origination Message 910 directed to the base station to setup the dedicated channels. The base station then transmits an Application Data Delivery Service (ADDS) Transfer/CM Service Request Message 920 which includes the SDB information and a data type indicator identifying the data as SDB. In addition, the functionality of the CM Service Request Message can be included in this message to eliminate an extra message on the network. Then, in block 930, call setup according to one of the various methods described above can proceed.

Thus, when the access for the Origination Message succeeds, the network can forward the SDB content to the appropriate network entity, while the rest of the dedicated traffic channel establishment is still under way. This has several advantages. It eliminates the need for an additional time-consuming access attempt and eliminates the ADDS Transfer Message between the base station and the MSC. Network operations and establishment of the air interface dedicated channel occur in parallel. Processing in the mobile station is simplified. The net effect is that call setup latency is reduced.

Yet another alternative is to create an origination message that would include a request to restore the previous service configuration as well as deliver the SDB information. It will be clear to those skilled in the art that these methods can be employed with any of the call setup procedures described above.

Figure 12:
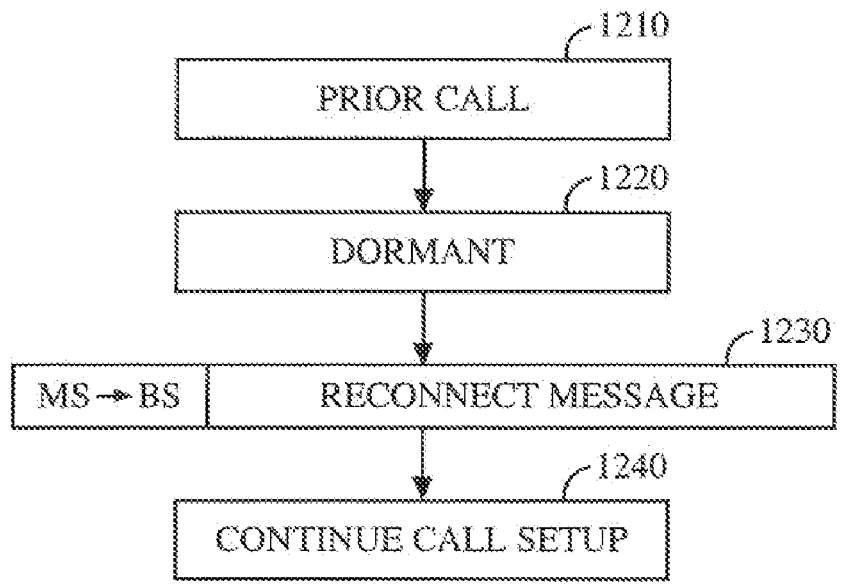
FIG. 12 depicts a method for mobile station initiated reconnection of a dormant packet data call.

In an alternative embodiment, depicted in FIG. 12, a shorter version of the Origination Message, referred to herein as a Reconnect Message 1230, which carries the minimally required fields for reconnecting a dormant packet data call is employed. The number of such fields is relatively small, as detailed below. For the case of network-initiated reconnection of dormant calls, this Reconnect Message 1230 can be used instead of the Page Response Message 23. Note that when a larger set of fields is required, the current Origination Message, such as 1 or 910, or the Page Response Message 23 can still be used.

Packet data calls can be described using three states: null, dormant and active. A packet data connection can persist indefinitely, although it may change states frequently. When a packet data connection is first established, it is created from the null state. Similar to establishing a voice call, all the relevant parameters must be negotiated and agreed to. Once the call is created it enters the active state, similar to the traffic state described above. In the active state, a physical channel is established and data flows between the mobile station and base station. From time to time, the packet data connection may no longer need to be active, since no data is flowing in either direction. At this point, the physical channel is torn down, and the packet data call goes into the dormant state.

While the packet data connection is in the dormant state, the service configuration information can be stored in both the mobile station and the base station. In addition, the protocol state is also stored in the mobile station and the PDSN. For example, if the Point-to-Point Protocol (PPP) is used, its state, such as IP address, etc., remains while the call switches from active to dormant. Only the physical channel itself needs to be released to free up the resource for other users. Thus, when reconnecting a dormant call, only a small subset of the fields in the Origination Message is required. With the increased use of packet data calls, the percentage of call setup originations in a system are associated with bringing a dormant packet data service back to the active state.

The Release A Origination Message was designed to originate a variety of call types including voice, circuit-switched data, packet-switched data, etc. As such, it contains fields that are a superset of fields required for each type of call setup. With respect to reconnecting a dormant packet data call, the fields in the Origination Message can be classified into three classes: not needed, may be needed, or needed. Examples of fields not needed are those specific to voice calls. In some cases, certain parameters have been negotiated in a previous call setup, so those are examples of fields that may not be needed. The SYNC_ID field is an example of a required field, as it indicates that the stored parameter set is to be used. As can readily be seen, a Reconnect Message 1230 that eliminates those fields not required will be significantly smaller than the Release A Origination Message.

When this embodiment is deployed, the Reconnect Message 1230 can often be transmitted in a single frame, resulting in a number of benefits. One benefit is that the transmission time is reduced. Another benefit is that the message error rate, now equal to the frame error rate, is reduced. Both of these benefits result in reducing the call setup latency associated with reconnecting a dormant packet call.

FIG. 12 depicts an embodiment of a mobile station originated dormant call reconnection. In step 1210, a prior packet data call is established, whether from the null state or a reconnection from the dormant state. The call goes from active to dormant in step 1220. When the mobile station determines that the call should be reconnected, it sends to the base station Reconnect Message 1230, a message which contains the minimum required fields to reestablish the connection, as described above. This message takes the place of the Origination Message, such as 1 or 910, as described above with respect to FIGS. 1 and 9, respectively. After the Reconnect Message 1230 is sent, the call setup is continued in step 1240, according to one of the methods disclosed herein.

Figure 13:
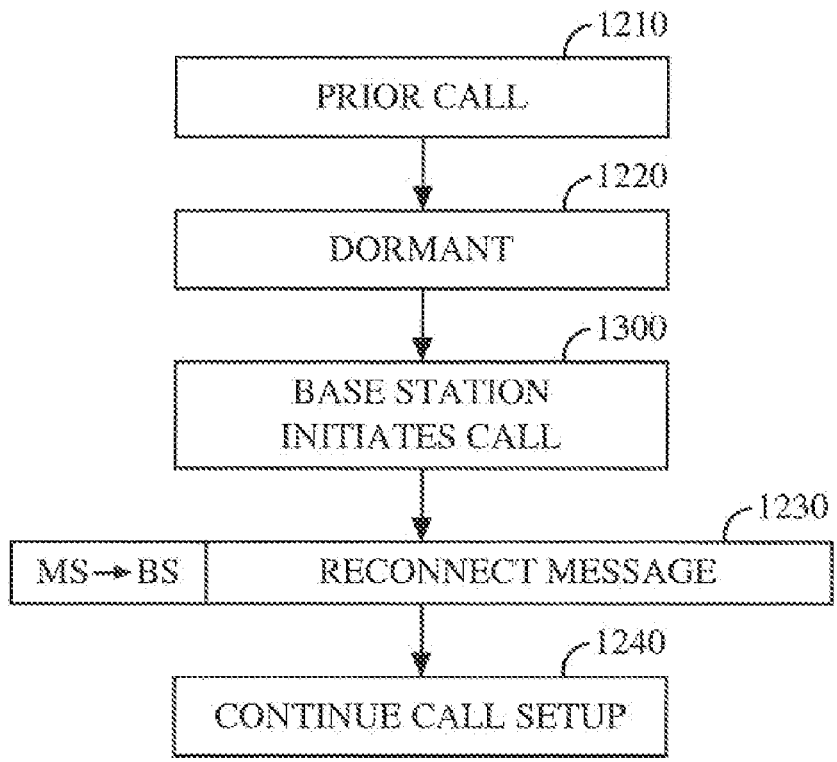
FIG. 13 depicts a method for mobile station terminated reconnection of a dormant packet data call.

FIG. 13 depicts an embodiment of a mobile station terminated dormant call reconnection. Steps 1210 through 1240 are identical to the steps just described in relation to FIG. 12, with the exception that step 1300, where the base station initiates the call, is inserted between the dormant state 1220 and the Reconnect Message 1230. The base station, in step 1300, initiates the reconnection of the call, according to one of the procedures disclosed herein, and the mobile station responds with Reconnect Message 1230, instead of a Page Response Message 23, described above.

Another embodiment addresses the call latency introduced by the length of the channel assignment message, such as Channel Assignment Message 5, 30, or 810, described above. In Release A of the cdma2000 standard, each time dedicated channels are established via the Channel Assignment Message, the base station must specify the complete active set in this message. The active set consists of the number of pilots and the required parameters for each pilot, which include the following: pilot PN sequence offset index, pilot record corresponding to the type of pilot, power control symbol combining indicator, code channel index for the fundamental channel, quasi-orthogonal function mask identifier for the fundamental channel, code channel index for the dedicated control channel, and the quasi-orthogonal function mask identifier for the dedicated control channel. The pilot record contains: transmit diversity (TD) transmit power level, transmit diversity mode, Walsh code for the auxiliary/transmit diversity pilot, quasi-orthogonal function index for the auxiliary/transmit diversity pilot, and the auxiliary transmit diversity pilot power level. These parameters can end up being a significant number of bytes. Each of these parameters may introduce latency due to the time required to transmit them (if they cause the message to extend to the next frame), and the processing time for the mobile station to process them.

Figure 10:
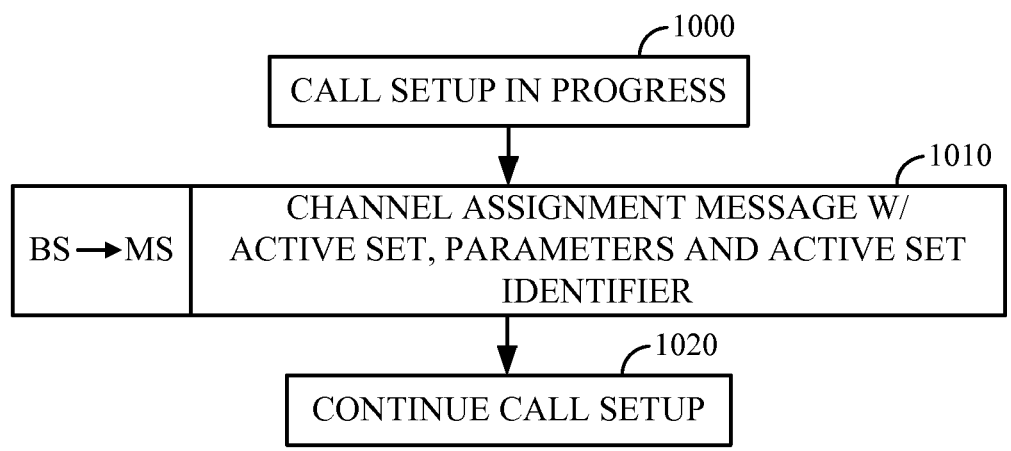
FIG. 10 depicts a method for associating active set identifiers with active sets.
Figure 11:
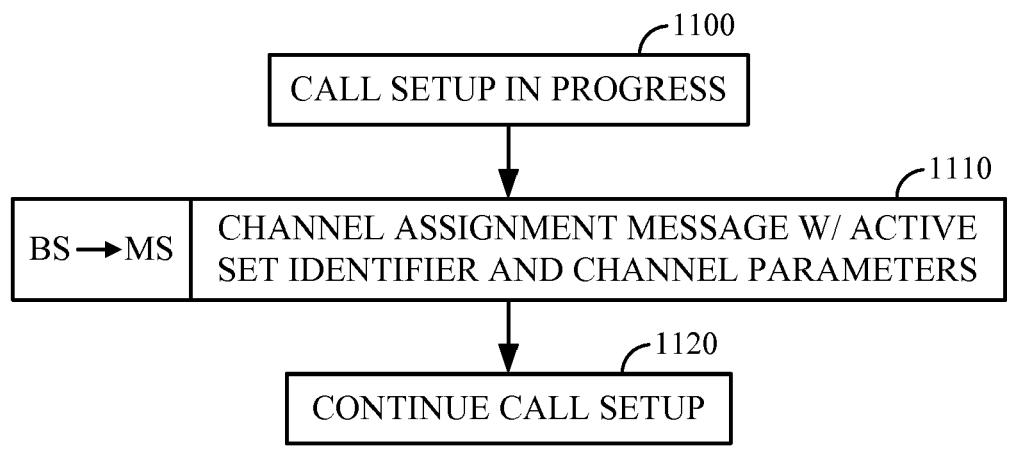
FIG. 11 depicts a method for reducing Channel Assignment Message length by utilizing active set identifiers.

The embodiment comprising the methods depicted in FIG. 10 and FIG. 11 utilizes an active set identifier to identify an active set and associated parameters. Instead of specifying the complete list of members and active set parameters, such as those described above, the base station simply specifies the active set identifier corresponding to the particular configuration. This technique may reduce the length of the Channel Assignment Message, and has the following advantages: reduction in Channel Assignment Message transmission time and reduction in the probability that the Channel Assignment Message is received in error. The net effect is that call setup latency is reduced. Note that since it is likely that some of the active set parameters may have changed, an alternative is for the base station to send the active set identifier plus those parameters that have changed. This alternative embodiment adds flexibility which may lend itself to use in a wider variety of applications.

The embodiment just described may comprise either of the methods depicted in FIG. 10, FIG. 11, or both. The method of FIG. 10 depicts one method for assigning an active set identifier to a particular active set. In block 1000, the call setup procedure is in process. The base station then sends to the mobile station a Channel Assignment Message 1010 including the complete active set and parameters. In addition, the Channel Assignment Message 1010 includes an active set identifier which the mobile station can associate with that active set. In block 1020, the call setup process continues. An alternate method for assigning active set identifiers to active sets is to have the base station download to the mobile station such active set/active set identifier pairs in advance of the communication in which they will be used.

FIG. 11 depicts a method for utilizing the active set identifier once it has been assigned to an active set, using a procedure such as that described in FIG. 10. In block 1100, the call setup procedure is in progress. The base station sends to the mobile station a Channel Assignment Message 1110 including the active set identifier. Since the mobile station knows the members of the active set and the corresponding parameters for each of the members corresponding to the active set identifier, the active set identifier is sufficient to perform the channel assignment. Alternatively, if the parameters associated with the active set identifier have changed, message 1110 can include the active set identifier, along with the changed parameters. The call setup procedure continues in block 1120. The mobile station and the base station can ensure that active set configurations and their corresponding active set identifiers are in synchronization between the mobile station and the base station using the mechanism specified in the cdma2000 standard for validation of SYNC_ID, that is the method for restoring stored service configurations.

A similar technique can be employed in conjunction with the methods described in FIG. 6 and FIG. 7 to reduce the message length of PSMM 610 and PSMM 720, respectively. A pilot identifier can be associated with each of a number of pilot configurations, such that only an identifier needs to be transmitted as the mobile station updates the base station with one of the currently identified pilot configurations. But this may be less likely since pilot strength can take many values and hence may be difficult to associate with an identifier.

Another alternate method is to assign identifiers for each member of an active set (and its associated parameters). With this technique, a plurality of identifiers would be included in Channel Assignment Message 1110 to represent a plurality of members. This provides a more granular approach which results in a slightly longer message, but allows greater flexibility in that a large number of active sets can be identified using combinations of a relatively smaller set of stored member configurations. A base station could use a combination of the techniques just described. These techniques can be deployed in combination to reduce the overall transmission time associated with each transmitted Channel Assignment Message 1110. It will be clear to those skilled in the art that these methods can be employed with any of the call setup procedures described herein. Note that this method can be utilized in all messages where the active set is included. Another example includes the Universal Handoff Direction Message, where employing this method can decrease the message size and therefore reduce the message error rate as well.

Figure 14:
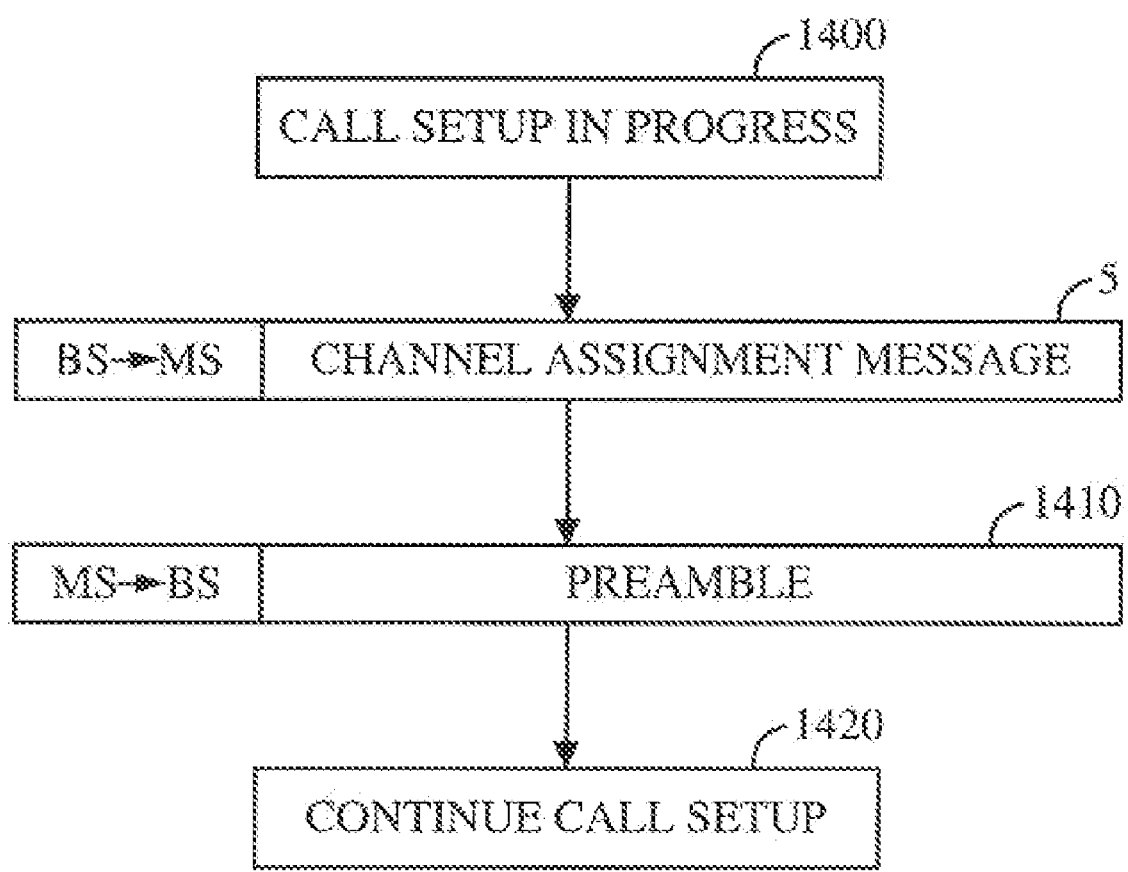
FIG. 14 depicts a method for immediately transmitting a Preamble in response to a Channel Assignment Message.

In another embodiment, depicted in FIG. 14, call setup latency can be reduced by immediately transmitting the Preamble 6 in response to a Channel Assignment Message such as 5, 30, 810, 1010, or 1110, described above. As mentioned previously, Release A requires that a mobile station wait to receive two consecutive good frames on the forward link before enabling the reverse link and transmitting the preamble. If the mobile station does not receive two consecutive good frames within one second, it must abandon the call setup. The minimum time a mobile station must wait before transmitting the preamble is 40 to 60 milliseconds, since two frames correspond to 40 ms and waiting for a frame boundary takes another 0 to 20 ms.

In this embodiment, call setup is in progress in step 1400. The base station then sends a Channel Assignment Message, denoted as 5 in FIG. 14, but could be any Channel Assignment Message such as 30, 810, 1010, or 1110, described above. In response, the mobile station immediately sets up the reverse link and begins transmitting Preamble 1410, without waiting to receive good frames on the forward link. Then, in step 1420, call setup continues according to a variety of call setup procedures, such as those described herein. The mobile station can continue to monitor the forward link for good frames, and can terminate the call if a number of good frames are not received within a prescribed time frame. For example, the mobile station can look for two consecutive good frames within one second, as described in Release A. Alternatively, to reduce interference to other users, the mobile station can turn off the preamble if the requisite number of good frames is not received within a prescribed time period. This time period may be shorter than the time period allowed for good frames to arrive. Thus, if the good frame requirement is not met within the first time period, the mobile station can cease transmitting the preamble, but continue monitoring the forward link for good frames within the second time period. If the good frames ultimately arrive, the mobile station can begin transmitting the preamble in response. This alternate technique can be used to reduce the interference to other users in situations where good frames are either slow to materialize or never arrive. Note that Preamble step 1410 can be substituted for Preamble step 6 in any of the embodiments disclosed herein.

In contrast to the method of Release A, the mobile station will be transmitting on the reverse link, at least for some period of time, even when the call will ultimately be aborted. In these situations, the interference level to other users will be increased slightly, with all the deleterious effects that accompany increased other-user interference. However, in many cases, the probability of receiving good frames on the forward link will be high, and using this embodiment will reduce the call latency, with all its accompanying benefits, which will outweigh the deleterious effects of occasionally setting up a reverse link for a call which cannot be completed.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for call setup in a wireless communication system comprising:

sending a first channel assignment message from a first station to a second station, the first channel assignment message comprising an active set and parameters of the active set with an active set identifier for association therewith; and sending a second channel assignment message from the first station to the second station, the second channel assignment message comprising the active set identifier associated with the active set and the parameters of the active set.

2. An apparatus used to set up a call in a wireless communication system, comprising:

a memory; and a digital signal processing device communicatively coupled to the memory, the digital signal processing device capable of executing instructions to:

receive a first channel assignment message comprising an active set and parameters of the active set with an active set identifier for association therewith; and receive a second channel assignment message, the second channel assignment message comprising the active set identifier associated with the active set and the parameters of the active set.

3. An apparatus used to set up a call in a wireless communication system, comprising:

a memory; and a digital signal processing device communicatively coupled to the memory, the digital signal processing device capable of executing instructions to:

send a first channel assignment message from a first station to a second station, the first channel assignment message comprising an active set and parameters of the active set with an active set identifier for association therewith; and send a second channel assignment message from the first station to the second station, the second channel assignment message comprising the active set identifier associated with the active set and the parameters of the active set.

4. A method for call setup in a wireless communication system comprising:

receiving a first channel assignment message comprising an active set and parameters of the active set with an active set identifier for association therewith; and receiving a second channel assignment message, the second channel assignment message comprising the active set identifier associated with the active set and the parameters of the active set.

5. An apparatus for setting up a call in a wireless communication system, comprising:

means for receiving a first channel assignment message comprising an active set and parameters of the active set with an active set identifier for association therewith; and means for receiving a second channel assignment message, the second channel assignment message comprising the active set identifier associated with the active set and the parameters of the active set.

6. The apparatus of claim 5, wherein the apparatus is a mobile station.

7. An apparatus for setting up a call in a wireless communication system, comprising:

means for sending a first channel assignment message from a first station to a second station, the first channel assignment message comprising an active set and parameters of the active set with an active set identifier for association therewith; and means for sending a second channel assignment message from the first station to the second station, the second channel assignment message comprising the active set identifier associated with the active set and the parameters of the active set.

8. The apparatus of claim 7, wherein the apparatus is a base station.

9. A computer readable medium having executable instructions stored thereon, the instructions comprising:

code for receiving a first channel assignment message comprising an active set and parameters of the active set with an active set identifier for association therewith; and code for receiving a second channel assignment message, the second channel assignment message comprising the active set identifier associated with the active set and the parameters of the active set.

10. A computer-program product for setting up a call in a wireless communication system, the computer-product comprising a computer readable medium having instructions thereon, the instructions comprising:

code for sending a first channel assignment message from a first station to a second station, the first channel assignment message comprising an active set and parameters of the active set with an active set identifier for association therewith; and code for sending a second channel assignment message from the first station to the second station, the second channel assignment message comprising the active set identifier associated with the active set and the parameters of the active set.

* * * * *